(12) United States Patent
Einthoven et al.

(10) Patent No.: US 7,440,825 B2
(45) Date of Patent: Oct. 21, 2008

(54) CONSTANT VERTICAL STATE MAINTAINING CUEING SYSTEM

(75) Inventors: Pieter G. Einthoven, West Chester, PA (US); Channing S. Morse, Mesa, AZ (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/424,149

(22) Filed: Jun. 14, 2006

(65) Prior Publication Data
US 2006/0219840 A1   Oct. 5, 2006

Related U.S. Application Data

(62) Division of application No. 10/613,253, filed on Jul. 3, 2003.

(51) Int. Cl.
*G06F 17/00* (2006.01)

(52) U.S. Cl. .......................... 701/3; 244/75.1; 244/186; 340/974; 340/969; 359/630

(58) Field of Classification Search .................. 701/3, 701/1, 13; 244/17.13, 195, 236, 75 R, 223, 244/17.3, 182, 75.1, 186, 185; 318/685, 318/628; 340/980, 974, 969, 975; 359/630
See application file for complete search history.

(56) References Cited

U.S. PATENT DOCUMENTS

| | | | | |
|---|---|---|---|---|
| 3,733,039 A | * | 5/1973 | O'Connor et al. | 244/181 |
| 4,012,626 A | * | 3/1977 | Miller et al. | 701/218 |
| 4,078,749 A | | 3/1978 | Johnson, Jr. | |
| 4,168,045 A | * | 9/1979 | Wright et al. | 244/17.13 |
| 4,345,195 A | * | 8/1982 | Griffith et al. | 318/628 |
| 4,420,808 A | * | 12/1983 | Diamond et al. | 701/4 |
| 4,516,063 A | | 5/1985 | Kaye et al. | |
| 4,580,223 A | * | 4/1986 | Wright et al. | 701/12 |
| 4,603,389 A | * | 7/1986 | Griffith et al. | 701/7 |
| 4,607,202 A | | 8/1986 | Koenig | |
| 4,645,141 A | * | 2/1987 | McElreath | 244/17.13 |
| 4,664,346 A | | 5/1987 | Koenig | |
| 4,696,445 A | * | 9/1987 | Wright et al. | 244/229 |

(Continued)

FOREIGN PATENT DOCUMENTS

GB         947619         1/1964

OTHER PUBLICATIONS

Whalley, Mattew S., "A Compilation of Active Sidestick and Conventional Inceptors for Helicopter Flight Envelope Tactile Cueing", American Helicopter Society 56th Annual Forum, Virginia Beach, Virginia, May 2-4, 2000.

(Continued)

*Primary Examiner*—Tuan C To
(74) *Attorney, Agent, or Firm*—Ostrager Chong Flaherty & Broitman P.C.

(57) ABSTRACT

This invention relates to the concept of managing the rate of change of energy in a helicopter or other aeronautical vehicle. The invention uses energy management calculations to determine the maximum longitudinal and lateral inputs that can be made while still enabling the vehicle to maintain a desired vertical state. The results of the calculations can be cued to the pilot either tactilely, aurally, or visually, or used for internal software limiting.

20 Claims, 4 Drawing Sheets

U.S. PATENT DOCUMENTS

| | | | |
|---|---|---|---|
| 4,717,098 A | | 1/1988 | Walker et al. |
| 4,846,421 A | | 7/1989 | Trikha |
| 5,001,646 A | | 3/1991 | Caldwell et al. |
| 5,076,517 A | * | 12/1991 | Ferranti et al. .............. 244/228 |
| 5,117,362 A | * | 5/1992 | Peckham et al. ................ 701/5 |
| 5,169,090 A | | 12/1992 | Wright et al. |
| 5,224,664 A | * | 7/1993 | Adams et al. ............ 244/17.13 |
| 5,310,136 A | | 5/1994 | Fowler et al. |
| 5,347,204 A | | 9/1994 | Gregory et al. |
| 5,404,305 A | | 4/1995 | Stiles, Jr. |
| 5,428,543 A | * | 6/1995 | Gold et al. ..................... 701/5 |
| 5,465,212 A | | 11/1995 | Fowler et al. |
| 5,746,398 A | | 5/1998 | Rollet et al. |
| 5,841,018 A | | 11/1998 | Watson et al. |
| 5,863,012 A | * | 1/1999 | Rollet et al. ............. 244/17.13 |
| 5,901,927 A | | 5/1999 | Ho |
| 5,971,325 A | | 10/1999 | Gold et al. |
| 6,014,117 A | * | 1/2000 | Hennessy et al. .............. 345/8 |
| 6,128,554 A | | 10/2000 | Damotte |
| 6,145,428 A | * | 11/2000 | Gold et al. ................. 89/41.21 |
| 6,334,592 B1 | | 1/2002 | Tomio et al. |
| 6,622,065 B2 | | 9/2003 | Mezan |
| 6,648,269 B2 | * | 11/2003 | Gold et al. ............... 244/17.13 |
| 6,691,950 B2 | * | 2/2004 | Salesse-Lavergne ..... 244/17.13 |
| 6,735,500 B2 | | 5/2004 | Nicholas et al. |
| 2002/0052675 A1 | * | 5/2002 | Mezan .......................... 701/4 |
| 2003/0066927 A1 | * | 4/2003 | Salesse-Lavergne ..... 244/17.13 |
| 2003/0094539 A1 | * | 5/2003 | Schaeffer et al. ......... 244/17.13 |
| 2005/0151672 A1 | * | 7/2005 | Augustin et al. ............ 340/965 |

OTHER PUBLICATIONS

Einthoven, Pieter and Miller, Dave, "The HACT Vertical Controller", American Helicopter Society 58th Annual Forum, Montreal, Canada, Jun. 11-13, 2002.

Miller, David G., Einthoven, Pieter G., Morse, Channing S., Wood, John, "HACT Flight Control System (HFCS) Control Law Overview", American Helicopter Society 58th Annual Forum, Montreal, Canada, Jun. 11-13, 2002.

* cited by examiner

CONSTANT VERTICAL STATE MAINTAINING CUEING SYSTEM

RELATED APPLICATIONS

This application is a divisional application of, and claims priority from, pending prior application Ser. No. 10/613,253, filed Jul. 3, 2003.

GOVERNMENT CONTRACT

This invention was made with Government support under contract DAAH10-00-C-0052 awarded by the United States Army. The Government has certain rights in this invention.

TECHNICAL FIELD

The present invention relates generally to aeronautical vehicle systems, and more particularly, to a method and system for cueing a vehicle operator as to maximum allowable accelerations and decelerations that may be performed while maintaining a constant vertical state without disengagement therefrom.

BACKGROUND OF THE INVENTION

In an aeronautical vehicle, such as a helicopter, a vehicle operator uses control inceptors to control the vehicle. Position changes of each control inceptor causes changes in orientation of aerodynamic surfaces and engine generated output power of the vehicle. In a helicopter such changes usually include the pitch of the main and tail rotor blades and the angle of a horizontal stabilator.

Traditionally, for helicopters, a dominant trend has been for a vertical control inceptor to predominantly be used in adjusting the pitch of all main rotor blades, which is commonly known as collective pitch, and in adjusting engine output power. A two axis longitudinal and lateral control inceptor is predominantly used in adjusting pitch of the main rotor blades as a function of blade position, which is commonly known as cyclic pitch. In using the stated convention, the vehicle operator can control the vertical velocity of the vehicle by adjusting the vertical inceptor and he can control the pitch and roll attitude by adjusting the longitudinal and lateral inceptors. By controlling the pitch and roll of the vehicle the operator can control the longitudinal and lateral acceleration and velocity of the vehicle.

A vehicle operator can maintain a constant altitude or vertical velocity, hereinafter referred to as a vertical state, by positioning the vertical inceptor in an appropriate position. The correct vertical inceptor position for maintaining the desired vertical state changes with changes in the acceleration and velocity along the longitudinal and lateral axes, requiring the operator to reposition the vertical inceptor.

Advanced vehicle control systems currently exist in the art for maintaining a specific vertical state. For example, a vehicle may have a control system capable of maintaining one or more vertical states, including constant vertical velocity state, a constant altitude state, or a constant flight path angle. Such vehicle control systems can function by automatically adjusting the vertical control inceptor position or by adding an electronic input in series with the vertical inceptor position.

Although vertical inceptor positions required to maintain a desired vertical state may currently be determined, since the vertical inceptor positioning effects power output of the engine as well as the collective pitch of the main rotor blades, there are many mechanical and aerodynamic limits associated with vertical inceptor positioning, which can limit the ability to maintain the desired vertical state.

Examples of such vertical axis limits are actuator limits, transmission torque limits, rotor over-speed and under-speed limits, rotor stall, rotor vortex ring state, and engine performance limits such as temperature and gas generator speed. These limits can be represented as minimum and maximum limits for vertical inceptor positioning.

Difficulties arise when, as a result of other vehicle operator actions such as commanding longitudinal and lateral accelerations, the vertical inceptor positions required to maintain the vertical state exceed one or more of the vertical axis limits. Depending on methods used in maintaining the desired vertical state and the methods used in limiting vertical inceptor positioning, the exceedance of a vertical axis limit may result in disengagement from or inability to maintain the vertical state or exceedance of the limit(s).

To maintain the desired vertical state and avoid exceedance of a limit a vehicle operator must continuously monitor vehicle instrumentation and vehicle performance, which distracts from the operators other tasks. Also, in order to be able to monitor instrumentation while navigating the vehicle, extensive training is required, which costs time and money. Also, the vehicle operator to maintain the desired vertical state and not exceed a limit, typically, operates the vehicle in a conservative manner and does not utilize full performance capabilities of the vehicle.

A related problem for vehicle operators occurs if the desired vertical state changes and the airspeed must be reduced to enable the vehicle to maintain the new state. In this scenario, the vehicle operator must determine how quickly to decelerate the vehicle to allow the new state to be maintained and when desiring to maintain a maximum airspeed the operator must avoid reducing speed of the vehicle more than required to maintain the new state.

It is sometimes necessary for the vehicle operator to require sudden deceleration or acceleration of the vehicle due to, for example, dangerous or hazardous situations. At the same time, it is often necessary during such situations to maintain a certain vertical altitude or state (for example, to prevent detection or ground contact). During these situations, the maximum and minimum limits of various operating conditions of the vehicle should not be exceeded in order for the vertical state to be maintained. However, it is often difficult for the operator to do so due to distractions and other concerns.

It is therefore desirable to provide a vehicle cueing system that is capable of cueing a vehicle operator to the maximum accelerations or decelerations that may be performed while maintaining a constant vertical state without exceeding any vertical vehicle limits or without disengaging, interrupting, or causing the vehicle to no longer be able to maintain the vertical state. Also, it is desirable that the vehicle cueing system cues a vehicle operator in a nondistracting and nonobstructing manner and minimize time required of the vehicle operator in monitoring vehicle instrumentation and aircraft performance.

Additionally, it is desirable that a vehicle cueing system operates in conjunction with existing vehicle control systems. For an aeronautical vehicle, relationships between a control inceptor position and corresponding vehicle response are control characteristics of the vehicle, which are carefully designed. Altering vehicle response characteristic can result in time consuming and costly testing of a vehicle and retraining of vehicle operators. Thus, a newly introduced vehicle cueing system should not significantly alter this relationship.

SUMMARY OF THE INVENTION

The present invention provides a method and system for cueing a vehicle operator as to maximum allowable longitudinal and lateral accelerations and decelerations that may be performed while maintaining a constant vertical state without disengagement therefrom.

The present invention provides a method for calculating maximum acceleration and decelerations (referred to as energy limits) that can be achieved on the longitudinal and lateral axes while maintaining a constant vertical state and not exceeding any vehicle limits related to the vertical axis. The energy limits on the longitudinal and lateral axes can be represented as minimum and maximum pitch and bank attitude limits.

The invention includes a method for commanding a desired vertical state and for determining the vertical axis inputs required to maintain the desired vertical state. In addition, the minimum and maximum vertical axis inputs are calculated. These values can be changing as vehicle flight conditions change. Two vehicle performance parameters should be determined, either analytically or experimentally, namely the amount that the vertical velocity will change in response to small changes in the vertical axis input, and the amount the engine or transmission torque will change in response to small changes in the vertical axis input. The maximum accelerations and deceleration are calculated using these identified vertical axis inputs and vehicle performance parameters.

Based on the determined information, the present invention can use two different calculations to determine the energy limits on the longitudinal and lateral axes. The first calculation is based on the equation of conservation of energy (the "energy method"). This method provides accurate calculations when the airspeed is not small. The second calculation uses the thrust required to balance gravitational forces for non-zero aircraft attitudes to calculate the energy limits on the longitudinal and lateral axes (the "attitude method"). The latter method is more appropriate for lower speed flight.

The present invention can be applied to a helicopter in several ways. The energy limits can be represented as stick limits and can be used to position tactile cues on the longitudinal and lateral control inceptors. The energy limits can be used to provide aural or visual cues to the vehicle operator, or to provide a stick shaker cue to the vehicle operator. The energy limits further can be used to limit the desired aircraft response in software that augments the inherent helicopter control response. (This is sometimes known as SAS for Stability Augmentation System). The energy limits can also be used to limit the aircraft commands in software that generates aircraft flight profiles (sometimes known as Mission Computer).

The present invention has several advantages over systems without energy limiting. If the energy limits are used to cue the vehicle operator using tactile, aural, or visual cues, the vehicle operator is better able to utilize the maximum available acceleration and deceleration of the vehicle while maintaining a desired vertical state. Such cueing also reduces the likelihood that the vehicle operator will exceed a vertical limit or fail to maintain the desired vertical state. This enables the pilot to spend less time performing in-vehicle tasks, such as monitoring instruments and vehicle performance, and more time navigating the vehicle, which decreases the chances for error.

If the energy limits are used in software to limit the desired aircraft response, or to limit the flight profile, then the desired aircraft response or flight profile can be programmed to use the maximum available acceleration and deceleration while maintaining a desired vertical state.

Another advantage of the present invention is that it relies only on parameters readily available in most aeronautical vehicles, such as helicopters. The minimum data that is required from aircraft sensors is torque, rotor speed, vertical velocity, pitch attitude and roll attitude. Other data that is available includes airspeed, and rate of change of altitude.

The vehicle controller determines a vertical inceptor position to maintain a vertical state. The controller positions the vertical inceptor or generates a signal to be summed in series with the vertical inceptor position or a combination of both to maintain the constant vertical state in response to the vehicle performance and operator inputs. The controller also determines the maximum and minimum vertical inceptor positions based on the vehicle limits. The allowable increase and decrease in the vertical inceptor before exceeding the maximum or minimum vertical inceptor positions is determined by the vehicle controller.

Using the principals of potential and kinetic energy, the allowable increase and decrease in the vertical inceptor position are related to the potential acceleration and deceleration on the longitudinal and lateral axes. An alternative method uses the relationship between the thrust required to maintain the vertical state and the gravitational force to relate the allowable increase and decrease in the vertical inceptor position to the maximum pitch or roll attitude of the vehicle.

The longitudinal and lateral acceleration and deceleration are directly related to the pitch and roll attitudes of the vehicle. Therefore the longitudinal and lateral acceleration and deceleration limits can be cued to the pilot as pitch and roll attitude limits. The pitch and roll attitude limits can be cued to the pilot through various methods including but not limited to tactile cues, aural cues, visual cues, and stick shakers. The pitch and roll limits can also be enforced by the vehicle controller without pilot intervention.

The present invention itself, together with further objects and attendant advantages, will be best understood by reference to the following detailed description, taken in conjunction with the accompanying drawings.

LIST OF SYMBOLS

The following symbols are used to describe the derivation of the equations which are set forth below:

| | |
|---|---|
| $E$ | Total energy (potential and kinetic). |
| $\dot{E}$ | Time rate of change of energy. |
| $g$ | Acceleration of gravity. |
| $h$ | Barometric altitude. |
| $\dot{h}$ | Vertical velocity. |
| $m$ | Mass of vehicle. |
| $Q$ | Main rotor torque in percent. |
| $T$ | Main rotor thrust. |
| $\delta_b$ | Longitudinal stick position (positive forward) [Note: replace with lateral stick position for lateral energy management calculations.] |
| $\delta_{b_{lim}}$ | Maximum displacement of longitudinal stick. |
| $\delta_c$ | Vertical controller position. |
| $\delta_{c_{h=0}}$ | Vertical controller position for flight path angle hold (or zero vertical acceleration). |
| $\delta_{c_{max}}$ | Practical upper limit for the vertical controller for safe operation of the vehicle. |
| $\delta_{c_{min}}$ | Practical lower limit for the vertical controller for safe operation of the vehicle. |
| $\delta_{c_Q}$ | Vertical controller position for zero torque. |
| $\theta$ | Pitch attitude (positive nose up). [Note: replace with roll attitude for lateral energy management calculations.] |
| $\theta_{lim}$ | Pitch attitude corresponding to full longitudinal stick input. |
| $v$ | In-plane airspeed (x and y-body axis components). |
| $\dot{v}$ | Acceleration along the longitudinal and lateral axes. |
| $\partial(\dot{h})/\partial(\delta_c)$ | Vertical control sensitivity corresponding to anticipated change in vertical velocity resulting from a small change in vertical controller position. |

DETAILED DESCRIPTION OF THE PREFERRED EMBODIMENT

While the present invention is described with respect to a method and system for cueing a helicopter vehicle operator as to maximum allowable accelerations and decelerations that may be performed during a constant vertical state without disengagement therefrom, the present invention may be adapted for any type of aeronautical vehicle or system.

In the following description, various operating parameters and components are described for one constructed embodiment. These specific parameters and components are included as examples and are not meant to be limiting.

Figure 1:
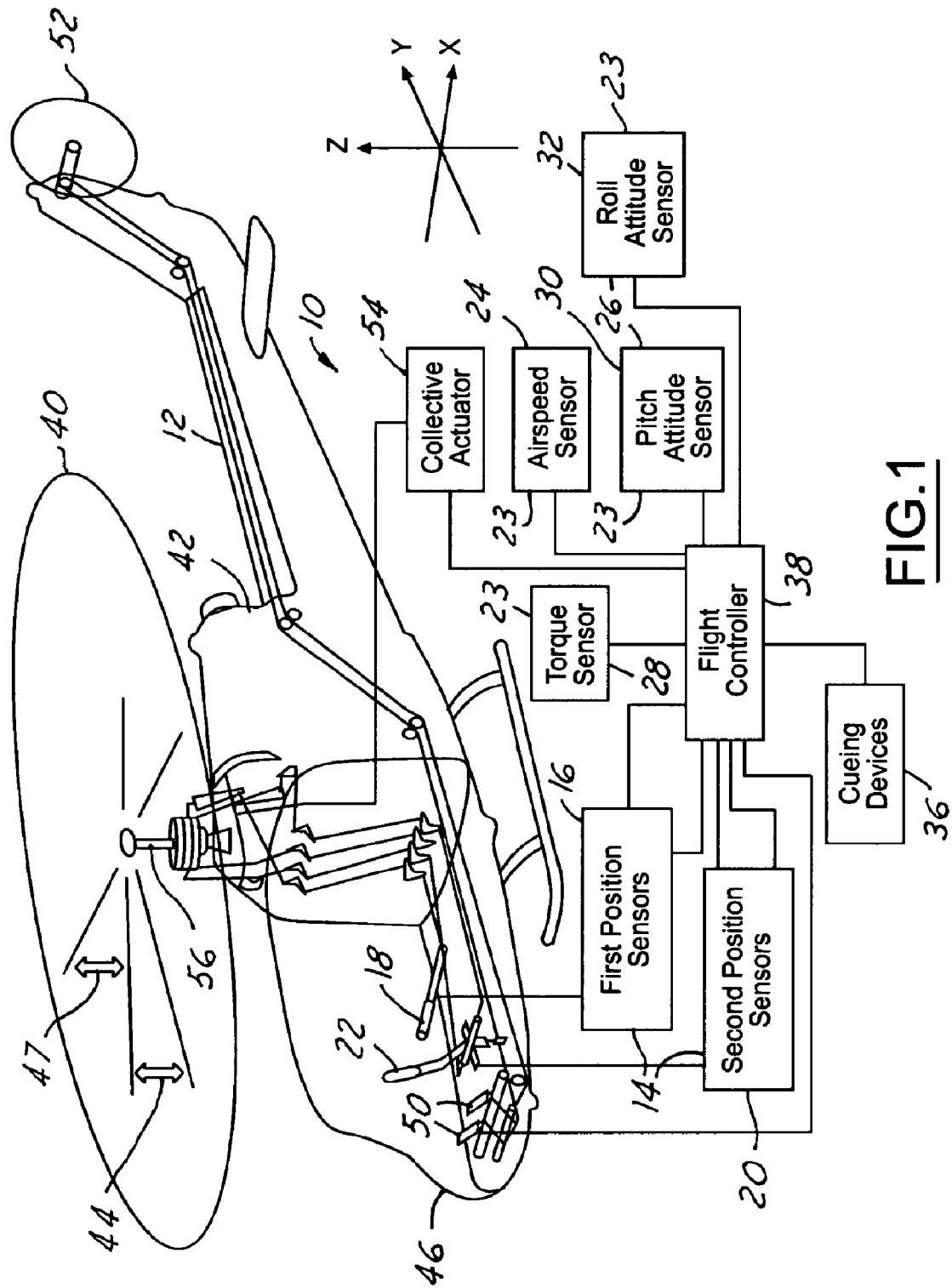
FIG. 1 is a perspective and diagrammatic view of a typical helicopter control system in accordance with an embodiment of the present invention.

Referring now to FIG. 1, a perspective and block diagrammatic view of a constant vertical state maintaining system 10 for helicopter-type aeronautical vehicle 12 in accordance with an embodiment of the present invention is shown. The cueing system 10 includes control inceptors 18 and 22 which are coupled to the flight controller 38 of the aeronautical vehicle. In the embodiment shown, the system 10 includes a vertical control inceptor 18 (which is also known as a collective lever) and a longitudinal and lateral control inceptor 22 (which is also known as a cyclic controller). Movement of the vertical control inceptor 18 is relayed to the flight controller 38 by, for example, a first position sensor 16. Movement of the longitudinal and lateral control inceptor 22 is relayed to the flight controller 38 by, for example, second position sensors 20.

Pulling up on the vertical control inceptor 18 causes the pitch of all the main rotor blades to increase equally and usually also increases the power output of the engine(s) 42. The result to the helicopter in normal flight is that the rate of climb is increased. Pushing down on the vertical control inceptor 18 has the opposite effect of decreasing the rate of climb.

The longitudinal and lateral control inceptor 22 is a single control inceptor with two degrees of freedom and controls the longitudinal and lateral attitude of the vehicle 12. Fore and aft motion causes the disk swept by the blades 40 to tip forward and aft, represented by arrow 44, resulting in the vehicle nose 46 pitching down and up. The longitudinal acceleration of the vehicle or aircraft 12 is directly related to the pitch attitude of the aircraft.

Left and right motions of the inceptor 22 causes the rotor disk and the helicopter to roll left and right represented by arrow 47. The lateral acceleration of the aircraft is directly related to the roll attitude of the aircraft.

The system 10 also includes various performance sensors 23 such as an airspeed sensor 24, one or more attitude sensors 26, and a torque sensor 28. In a preferred embodiment of the present invention, the attitude sensors 26 may be in the form of gyro sensors or in another form known in the art and include a pitch attitude sensor 30 and a roll attitude sensor 32, as shown. Various other vehicle performance sensors known in the art may be included in the system 10. The system 10 may also include one or more cueing devices 36 which may include, for example, other active control inceptors, heads up displays, visual and aural systems, stick shakers, or other cueing devices known in the art.

The flight controller 38 determines maximum allowable accelerations and decelerations while maintaining a constant vertical state without disengagement therefrom. The controller 38 generates a cueing signal and cues a vehicle operator as to pitch attitude limits and roll attitude limits, which relate to the maximum acceleration and deceleration limits. The pitch attitude limits and roll attitude limits correspond to positions of the control inceptor 22. The constant vertical states may include constant altitude, constant vertical velocity, constant flight path angle, or other constant vertical states known in the art.

The vehicle 12 may include rudder pedals 50 or other yaw controlling devices known in the art. Pressing on the rudder pedals causes the pitch on tail rotor blades 52 to decrease and increase, resulting in the vehicle 12 yawing right and left.

The above described inceptors and pedals also may be "mixed" such that when one inceptor or pedal is adjusted, inputs in series with one or more of the other inceptors and pedals may also be made through the vehicle electrical or mechanical systems. With these systems, each controller may make some input to actuators other than the primary actuator. For example, the controls may be arranged so that tail rotor blade pitch is increased automatically as the vertical control inceptor is pulled up.

The vehicle sensors 14, 20, and 23 may be of various types known in the art and may be in various locations on the vehicle 12. The sensors 23 may determine the current torque, current pitch and roll, longitudinal acceleration, lateral acceleration, vertical acceleration, current inceptor position, and other vehicle parameters known in the art. The torque sensor 28 may measure torque directly from the engine(s) 42, at a main shaft 56, or other locations.

An active control inceptor system may be used to adjust the inceptor force characteristics and/or to provide tactile cues. Active control inceptor systems are known in the art, and it is not necessary to describe one in more detail here. The tactile cue representations aid a vehicle operator by cueing the operator to the current inceptor positions for maintaining a desired vehicle state.

The flight controller 38 and the active control inceptor system are preferably microprocessor based such as a computer having a central processing unit, memory (RAM and/or ROM), and associated input and output buses. The controllers may be a portion of a central vehicle main control unit, an interactive vehicle dynamics module, or may each be stand-alone controllers as shown.

Figure 2:
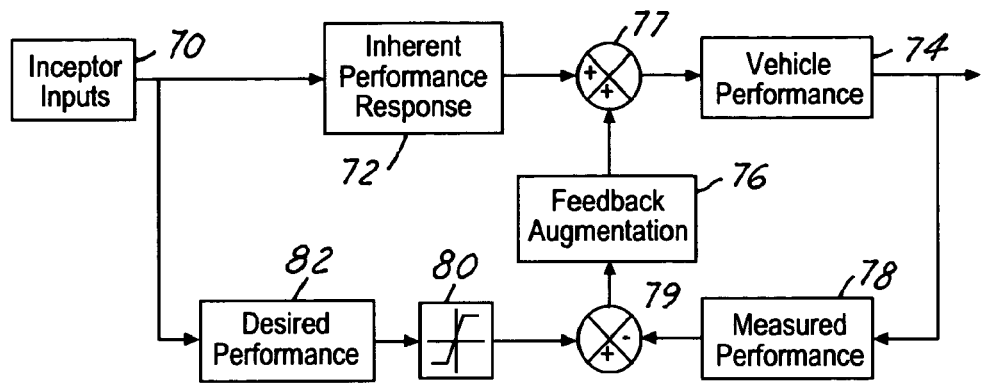
FIG. 2 is a flow diagram illustrating a vehicle control path in accordance with an embodiment of the present invention.

Referring now to FIG. 2, a flow diagram illustrating a vehicle control path in accordance with an embodiment of the present invention is shown. The vehicle operator makes vehicle control inputs through the control inceptors 18, 22 and 50. The inceptor inputs result in an inherent control response based on the mechanical linkage or the core programmed response for a fly-by-wire vehicle. The inceptor inputs 70 can also be used by a flight controller to determine the desired vehicle preference 82. The desired performance can be programmed to provide smooth and predictable response characteristics. The desired performance can be compared to the measured performance 78. The difference 79 between the desired and measured performance can be used to augment the inherent performance 72. Ideally, the results of the summation 77 of the inherent performance 72 and the feedback augmentation 76 is that the vehicle performance 74 is equal to the desired performance.

Within the vehicle control path there exist multiple locations where the present invention may be applied and implemented. For example, the present invention can be implemented as limits on the desired vehicle performance path 80. This will allow the vehicle controller to bound the desired response. Alternatively, the acceleration limits can be applied as tactile cues on the control inceptors. The tactile cues have the additional benefit of bounding both the inherent control path as well as the augmented control path. Finally the acceleration limits can be cued to the vehicle operator as visual cues, aural cues or stick shakers. While this type of cueing will also have the benefit of bounding the direct and augmented control paths, it will require the vehicle operator to process and respond to the cues and therefore is not anticipated to be as effective as the other methods of implementing the acceleration limits.

Figure 3:
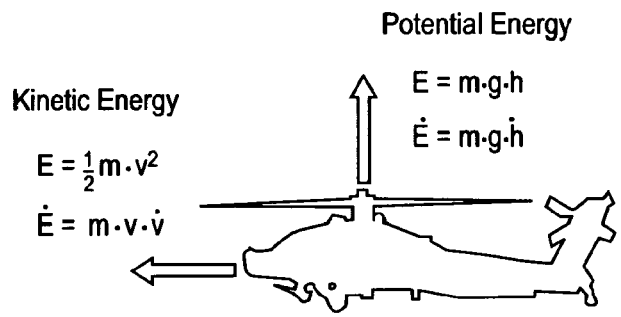
FIG. 3 schematically illustrates the concept of the energy method.

FIG. 3 illustrates the concept of the energy method. The time rate of change of energy ($\dot{E}$) can be traded between potential and kinetic terms. The kinetic energy terms are $$E = \frac{1}{2} \cdot m \cdot v^2$$

and $$\dot{E} = m \cdot v \cdot \dot{v},$$

while the potential energy terms are $$E = m \cdot g \cdot h$$

and $$\dot{E} = m \cdot g \cdot \dot{h}.$$

The allowable increase or decrease in the potential energy term is calculated using the vertical control inceptor positions for maintaining the vertical state and the maximum and minimum allowable vertical control inceptor positions. The allowable increase or decrease in potential energy is equal to the allowable increase or decrease in kinetic energy. From the kinetic energy equations, the allowable acceleration or deceleration is calculated. These equations apply to both the longitudinal and lateral axes.

Figure 4:
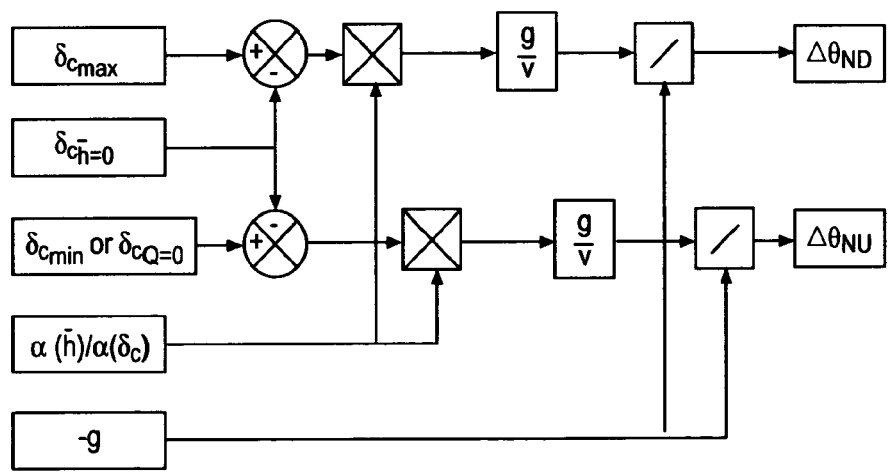
FIG. 4 is a flow diagram illustrating an implementation of the energy method in accordance with an embodiment of the present invention.

Referring now to FIG. 4, a flow diagram illustrating a conservation of energy based method in accordance with an embodiment of the present invention is shown. This diagram illustrates how the energy method can be implemented.

The calculations begin with the fundamental calculations of energy:

$$E = m \cdot g \cdot h + \frac{1}{2} \cdot m \cdot v^2 \qquad (1)$$

Taking the derivative of (1) yields:

$$\dot{E} = m \cdot g \cdot \dot{h} + m \cdot v \cdot \dot{v} \qquad (2)$$

The maximum allowable increase and decrease in the potential and kinetic energy can be related in derivative terms as follows:

$$\Delta \dot{E}_{max} = mg \cdot \Delta \dot{h}_{max} = mv \cdot \Delta \dot{v}_{max} \qquad (3)$$

$$\Delta \dot{E}_{min} = mg \cdot \Delta \dot{h}_{min} = mv \cdot \Delta \dot{v}_{min} \qquad (4)$$

Solving for the maximum or minimum allowable acceleration yields:

$$\Delta \dot{v}_{max} = \frac{g}{v} \cdot \Delta \dot{h}_{max} \qquad (5)$$

$$\Delta \dot{v}_{min} = \frac{g}{v} \cdot \Delta \dot{h}_{min} \qquad (6)$$

Equations (5) and (6) show how a potential change in acceleration or deceleration of the aeronautical vehicle is related to the potential change in rate of climb.

The calculation of the potential change in rate of climb can be estimated from the control margin for the vertical axis and the approximation of the vertical control sensitivity. Since both acceleration and deceleration capabilities are involved, both the potential increase and decrease in rate of climb need to be calculated:

$$\Delta \dot{h}_{max} = \partial(\dot{h})/\partial(\delta_c) \cdot (\delta_{c_{max}} - \delta_{c_{\dot{h}=0}}) \qquad (7)$$

$$\Delta \dot{h}_{min} = \partial(\dot{h})/\partial(\delta_c) \cdot (\delta_{c_{min}} - \delta_{c_{\dot{h}=0}}) \qquad (8)$$

Substituting Equations (7) and (8) into (5) and (6) gives the relationship between vertical controller parameters and allowable change in acceleration or deceleration:

$$\Delta \dot{v}_{max} = \frac{g}{v} \cdot \partial(\dot{h})/\partial(\delta_c) \cdot (\delta_{c_{max}} - \delta_{c_{\dot{h}=0}}) \quad (9)$$

$$\Delta \dot{v}_{min} = \frac{g}{v} \cdot \partial(\dot{h})/\partial(\delta_c) \cdot (\delta_{c_{min}} - \delta_{c_{\dot{h}=0}}) \quad (10)$$

The acceleration limits can be related to the pitch (or roll) attitude limits using:

$$\Delta \dot{v} = -g \cdot \sin(\Delta\theta) \approx -g \cdot \Delta\theta \quad (11)$$

Finally, calculating the maximum and minimum pitch (or roll) attitude:

$$\Delta\theta_{ND} = \frac{-1}{v} \cdot \partial(\dot{h})/\partial(\delta_c) \cdot (\delta_{c_{max}} - \delta_{c_{\dot{h}=0}}) \quad (12)$$

$$\Delta\theta_{NU} = \frac{-1}{v} \cdot \partial(\dot{h})/\partial(\delta_c) \cdot (\delta_{c_{min}} - \delta_{c_{\dot{h}=0}}) \quad (13)$$

Equations (12) and (13) work well when the aeronautical vehicle is moving relative to the air mass, but do not work well as the airspeed approaches zero because of the velocity term in the denominator. For flight near zero airspeed, the attitude method calculation is used which is based on the thrust required to balance the gravitational forces on the aircraft.

Figure 5:
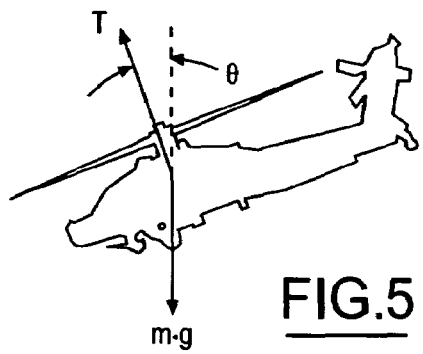
FIG. 5 schematically illustrates the concept of the attitude method.

FIG. 5 illustrates the concept of the attitude method. The thrust (T) required to maintain the vertical state of non-accelerated flight must be sufficient to balance the gravitational terms (mg) for the current pitch and roll attitude. By calculating the ratio of the current thrust to the maximum thrust, the ratio of the current pitch attitude to the maximum pitch attitude (or the current roll attitude to the maximum roll attitude) can be determined.

Utilizing Newton's laws of gravitation force, force F equals mass m multiplied by acceleration a, as shown in Equation (14):

$$F = m \cdot a \quad (14)$$

Force F corresponds to thrust T from the blades 40, mass m is mass of the vehicle 12, and acceleration a is the acceleration of gravity g, as shown by Equation (15).

$$T = m \cdot g \quad (15)$$

When thrust vector T is not aligned with gravitational vector g then pitch angle (or roll angle) is taken into account resulting in Equation (16):

$$T = \frac{m \cdot g}{\cos(\theta)} \quad (16)$$

Pitch attitudes and roll attitudes are not factored into Equation (16) at the same time, since pitch attitude limits are determined assuming that roll attitudes are unchanged and roll attitude limits are determined assuming that pitch attitudes are unchanged. Unchanged terms are cancel out.

Thrust T is related to torque Q of the engine(s) 42, which may be measured directly from the engine(s) 42 or indirectly at the shaft 56 or blades 40. Thrust T in relation to torque Q is represented by Equation (17):

$$T = C_1 \cdot Q^{2/3} \quad (17)$$

$C_1$ is a constant that cancels out when relating Equations (18) and (19) below. Substituting Equation (17) into (16) results in Equation (18):

$$C_1 \cdot Q^{2/3} = \frac{m \cdot g}{\cos(\theta)} \quad (18)$$

Similarly, for maximum pitch attitude $\theta_{max}$ related to maximum torque $Q_{max}$, Equation (19) is shown:

$$C_1 \cdot Q_{max}^{2/3} = \frac{m \cdot g}{\cos(\theta_{max})} \quad (19)$$

The effective torque ratio is defined by Equation (20):

$$\frac{Q}{Q_{max}} = \frac{\delta_{c_{\dot{h}=0}} - \delta_{c_0}}{\delta_{c_{max}} - \delta_{c_0}} \quad (20)$$

Defining the effective torque ratio based on vertical inceptor limits provides a more accurate result then simply using the ratio of current torque to maximum torque. This is because other limits such as rotor speed and motor temperature are included and may be more restrictive than the maximum torque limit.

Relating the current vehicle state or Equation (18) to a state for maximum performance, corresponding to Equation (19), and canceling constants yields Equation (21):

$$\frac{Q^{2/3}}{Q_{max}^{2/3}} = \frac{\cos(\theta_{max})}{\cos(\theta)} \quad (21)$$

Solving Equation (21) for the maximum pitch yields Equation (22)

$$\cos(\theta_{max}) = \cos(\theta) \cdot \left(\frac{Q}{Q_{max}}\right)^{2/3} \quad (22)$$

The allowable change in pitch attitude may be calculated, as shown in Equation (23):

$$\Delta\theta_{max} = \cos^{-1}\left(\cos(\theta) \cdot \left(\frac{Q}{Q_{max}}\right)^{2/3}\right) - \theta \quad (23)$$

Substituting Equation (20) into Equation (23) yields Equation (24):

$$\Delta\theta_{max} = \cos^{-1}\left(\cos(\theta) \cdot \left(\frac{\delta_{c_{\dot{h}=0}} - \delta_{c_0}}{\delta_{c_{max}} - \delta_{c_0}}\right)^{2/3}\right) - \theta \quad (24)$$

Equation (24) relates the maximum change in pitch attitude $\Delta\theta_{max}$ to current pitch angle $\theta$ and the known vertical positions $\delta_{c_{\dot{h}=0}}$, $\delta_{c_0}$ and $\delta_{c_{max}}$.

Equation (24) may be solved for maximum roll attitude limit as well as maximum pitch attitude limit, substituting $\Phi$ for $\theta$ (i.e. substituting bank angle for pitch angle).

Equation (24) does not have a corresponding deceleration limit. Instead, the maximum pitch attitude $\theta_{max}$ is valid for both longitudinal acceleration and deceleration changes. Likewise maximum roll attitude is valid for both starboard side and port side lateral acceleration changes.

Figure 6:
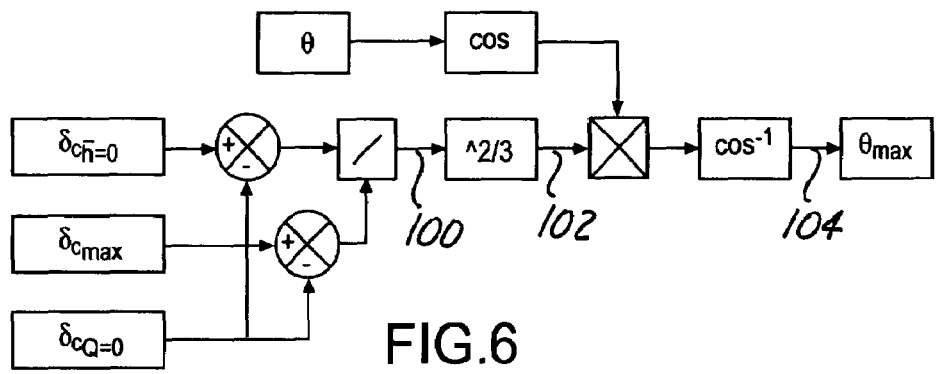
FIG. 6 is a flow diagram illustrating an implementation of the attitude method in accordance with an embodiment of the present invention.

FIG. 6 is a block flow diagram illustrating how the attitude method calculation can be implemented. The effective torque ratio as described in Equation (20) is calculated at step 100. The effective torque ratio calculates the ratio of torque used to maintain the current vertical state verses the torque corresponding to the most restrictive limit on the vertical axis. If the most restrictive vertical limit is the maximum allowable torque, then the calculation in step 100 is equal to the percent of the maximum allowable torque required to maintain the desired vertical state. In step 102, the effective torque ratio is transformed into an effective thrust ratio.

The maximum allowable pitch attitude is calculated in step 104. The attitude method calculation provides an absolute limit for the pitch attitude instead of the allowable change in pitch attitude. The maximum attitude calculation is independent of the sign of the velocity terms.

For simplicity, the above stated equations and FIGS. 3-8 all refer to a pitch axis for maintaining a constant altitude. The equations may be altered to refer to a roll axis, however, and to maintain other constant vertical states. All of the equations apply equally to a pitch axis or roll axis by substituting roll angle for pitch angle and lateral inceptor position for longitudinal inceptor position. Also, the equations are for example purposes only, and the equations may be modified or replaced depending upon the application.

Figure 8:
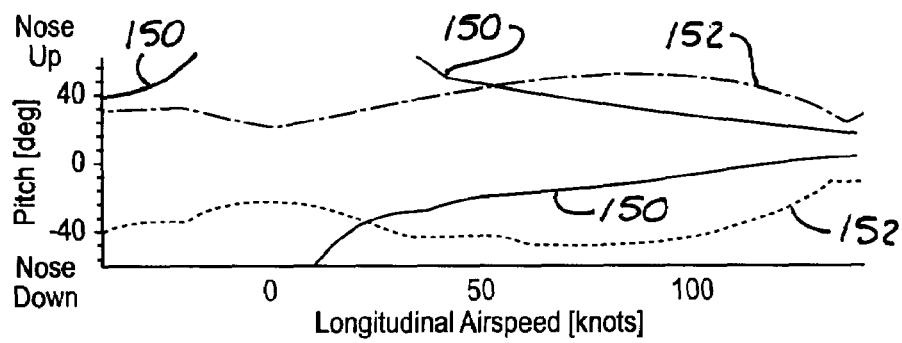
FIG. 8 is a plot for comparing conservation of energy based pitch attitude limits to thrust and gravitational force based pitch attitude limits in accordance with an embodiment of the present invention.

In FIG. 8, solid curve 150 represents the energy method based pitch attitude limits and dashed curve 152 represents the attitude method based pitch attitude limits. For example, if the airspeed is greater than 20 knots, then the energy method is the more restrictive for nose down pitch attitude or accelerating flight. For speeds less than 20 knots, the attitude calculations are the more restrictive.

Figure 9:
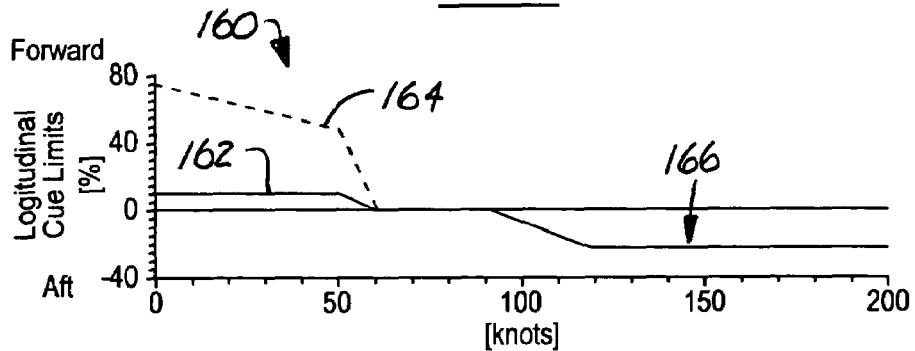
FIG. 9 is a sample plot illustrating a method for bounding the longitudinal inceptor cues to facilitate cueing the vehicle operator for corrective inputs if the vertical state cannot be maintained without exceeding the maximum vertical inceptor limit in accordance with an embodiment of the present invention.

FIG. 9 demonstrates a potential method 160 for using the present invention to assist a vehicle operator when the vehicle is in a condition where the vertical state cannot be maintained without exceeding the minimum or maximum vertical inceptor limits. Such conditions can occur when there is a sudden change in the desired vertical state (for example, the need to climb over an obstacle), or a sudden change in one of the vertical limits (such as an engine failure). This invention can be used to guide the vehicle operator with corrective action to return the vehicle to a condition where the vertical state can be maintained without violating the minimum and maximum vertical inceptor limits. FIG. 9 shows a potential solution for a traditional helicopter.

In high speed flight, the forward longitudinal limit (associated with the maximum nose down or maximum acceleration) is allowed to move aft of the neutral position, as shown in line 166. The neutral position is associated with zero acceleration. The forward longitudinal limit moving aft of the neutral position is the equivalent of a deceleration command. This effectively cues the vehicle operator to trade airspeed for the ability to maintain the vehicle start. For a typical helicopter configuration, there is a speed of approximately 80 knots below which there is no steady state benefit to trading airspeed for the vertical state. Therefore, line 166 does not extend below this speed threshold.

In low speed flight in a traditional helicopter, the power required to maintain altitude decreases with airspeed up to the minimum power speed of approximately 80 knots. If there is not enough power to maintain altitude, the vehicle operator may have to trade some altitude to gain airspeed towards the minimum power speed. With increased airspeed, the aircraft may be able to maintain altitude. This invention can be used to assist the operator in this type of trading altitude for airspeed by always allowing a small acceleration during low speed flight as shown with line 162. Line 162 ends at the airspeed where there is no further benefit for trading altitude for airspeed.

In the event of a single engine failure in a dual engine helicopter while in low speed flight, the operator may suddenly be in a situation where a large amount of airspeed for altitude must be traded. Upon recognition of such a scenario by the vehicle control system, line 162 can be moved out to line 164, allowing the vehicle operator to make the larger trading of altitude for airspeed required to recover from a single engine failure.

Figure 7:
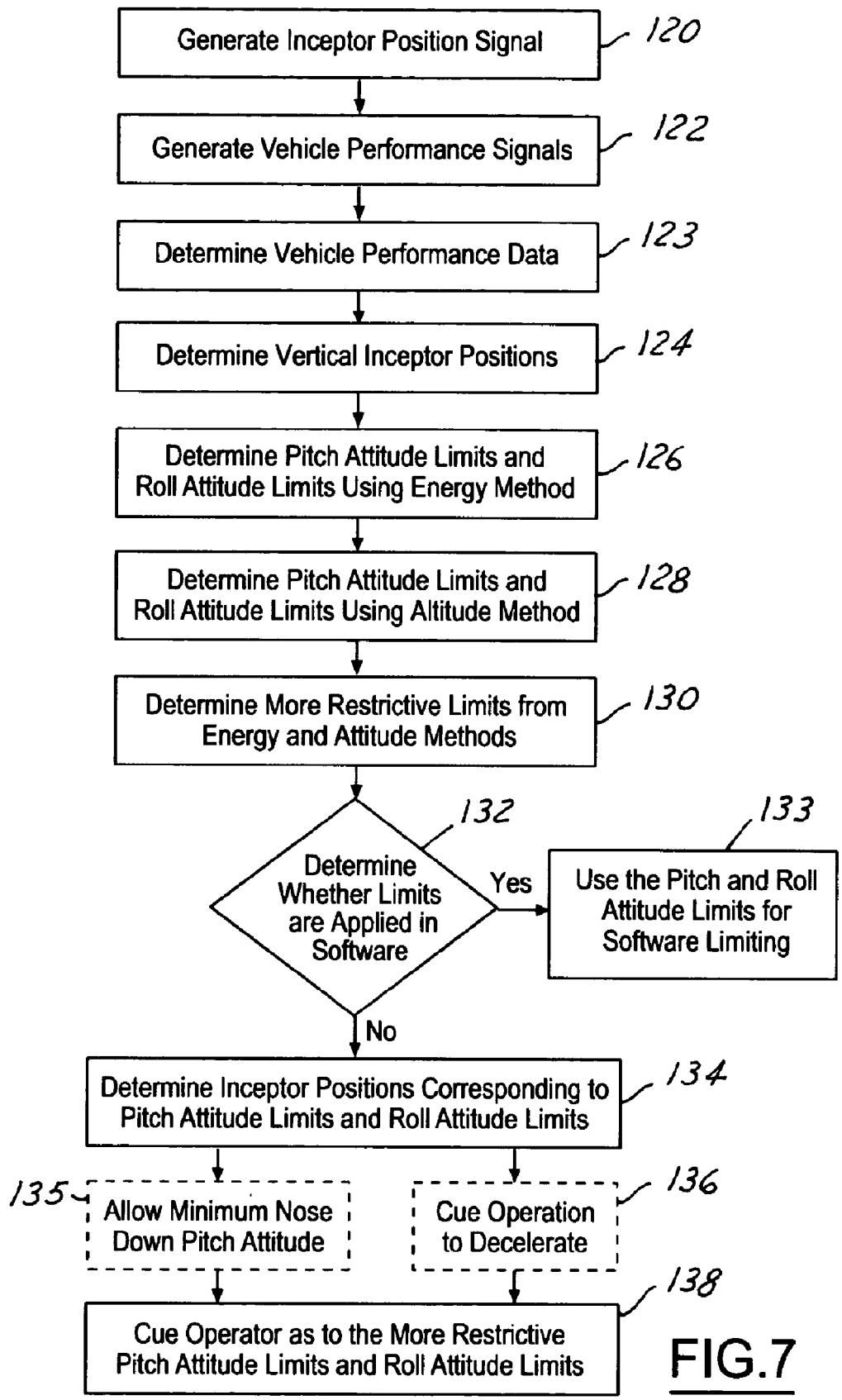
FIG. 7 is a logic flow diagram illustrating a method of cueing a vehicle operator of maximum allowable accelerations and decelerations that may be performed during a constant vertical state without disengagement therefrom in accordance with an embodiment of the present invention.

FIG. 7 is a logic flow diagram illustrating a method of cueing a vehicle operator of maximum allowable accelerations and decelerations that may be performed during a constant vertical state without disengagement therefrom in accordance with an embodiment of the present invention. The maximum acceleration and decelerations directly correspond with maximum and minimum pitch attitudes and roll attitudes that are allowable to maintain the constant vertical state.

In Step 120, the position of the vertical, longitudinal and lateral inceptors are measured by position sensors and inputted into the flight controller 38. The control inceptors may be manually adjusted by the operator or may be adjusted by a back drive or the cueing system 10.

In Step 122, the vehicle performance sensors generate vehicle performance signals to determine a current vehicle state. For example, the airspeed sensor 24 generates an airspeed signal, and the attitude sensors 26 generate pitch and roll attitude signals. Likewise, the torque sensor generates torque signals.

In Step 123, vehicle performance data is determined corresponding to a predicted response of the vehicle to small changes in vertical inceptor positioning including determining vertical velocity sensitivity and torque sensitivity. As known in the art, these sensitivity values may be determined using experimental data.

In Step 124, vertical inceptor positions are determined to maintain a desired vertical state, for maximum and minimum position limits for structural fatigue and aerodynamic limits, and for zero torque. The zero torque position may be determined by using the torque sensivity as described in Step 123.

In Step 126, calculations of pitch and roll attitude limits are made as specified in FIG. 4 and Equations (1)-(13) as described above.

In Step 128, calculation of pitch and roll attitude limits are made as specified in FIG. 6 and Equations (14)-(24) as described above.

In Step 130, the more restrictive of the limits selected in Steps 126 and 128 are selected. This is best seen in FIG. 8 which shows the relationship between the energy and attitude methods as a function of longitudinal airspeed. (The graph only shows general trends since the specific values are a function of the aircraft and flight conditions.)

In Step 132, a decision is made whether to perform software-limiting tasks. If software limiting is to occur, Step 133 is performed; otherwise Step 134 is performed. In Step 133, pitch and roll attitude limits are used for software limiting.

In Step 134, the controller 38 determines inceptor positions corresponding to the maximum and minimum allowable pitch attitudes and roll attitudes, using Equations (25) and (26):

$$\delta_{b_{max}} = \delta_b + \frac{\Delta\theta_{ND}}{\theta_{lim}} \cdot \delta_{b_{lim}} \quad (25)$$

$$\delta_{b_{min}} = \delta_b - \frac{\Delta\theta_{NU}}{\theta_{lim}} \cdot \delta_{b_{lim}} \quad (26)$$

Softstop positions are calculated from the inceptor position limits after compensating for other profile characteristics such as a deadband, static shaping, and others known in the art.

In Steps 135 and 136, limits are applied to the calculated longitudinal inceptor limits to allow the low speed trading of altitude for airspeed and the high speed trading of airspeed for a vertical state as shown in FIG. 9. These limits are only applicable if the vehicle is in a state where the vertical state cannot be maintained without exceeding one of the vertical limits.

In Step 138, the vehicle operator is cued to the longitudinal and lateral inceptor position limits. The most restrictive limits from the calculations in Steps 126, 128, 135, and 136 are selected. The limits can be cued to the pilot using tactile cues, stick shakers, visual cues, aural cues, or any other method of cueing known in the art.

The above-described steps are meant to be an illustrative example and the steps may be performed synchronously or in a different order depending upon the application. Also, the above-described steps illustrate an example for constant altitude. Other vehicle dynamic attributes may be applied using the present invention.

The present invention therefore provides a constant vertical state maintaining systems that cues a vehicle operator as to maximum and minimum pitch and roll attitudes that are allowable for a constant vertical state. The present invention converts vertical axis limits into longitudinal and lateral limits to provide a vehicle operator with better guidance as to the capabilities of a helicopter or other aeronautical vehicle. The present invention allows a vehicle operator to concentrate more on activity outside of an aircraft and less on instruments and internal vehicle tasks.

The above-described apparatus and method, to one skilled in the art, is capable of being adapted for various applications and systems including aeronautical vehicles and systems, control systems, cueing systems, or other applications or systems known in the art. The above-described invention can also be varied without deviating from the true scope of the invention.

While the invention has been described in connection with one or more embodiments, it is to be understood that the specific mechanisms, processes and procedures which have been described are merely illustrative of the principles of the invention, numerous modifications may be made to the methods and apparatus described without departing from the spirit and scope of the invention as defined by the appended claims.

What is claimed is:

1. A constant vertical state maintaining cueing system for a vehicle comprising:
   an inceptor having a minimum inceptor position and a maximum inceptor position;
   an airspeed sensor generating an airspeed signal;
   at least one attitude sensor generating an attitude signal;
   a vertical velocity sensor generating a vertical velocity signal;
   a torque sensor generating a torque signal; and
   a controller electrically coupled to said airspeed sensor, said at least one attitude sensor, said vertical velocity sensor and said torque sensor, said controller determining at least one vertical inceptor position for maintaining a constant vertical state in response to said vertical velocity signal and said torque signal and generating a cueing signal for maintaining said constant vertical state in response to said airspeed signal, said attitude signal, said minimum inceptor position, and said maximum inceptor position.

2. The system as in claim 1 wherein said controller in generating said cueing signal determines the amount of vertical velocity change and amount of torque change in response to changes in inceptor position.

3. The system as in claim 1 further comprising an active control inceptor system, said active control inceptor system having a plurality of positions and a position sensor coupled to said control inceptor and generating a control inceptor position signal, wherein said controller generates said cueing signal in response to said control inceptor position signal.

4. The system as in claim 1 wherein said controller generates a vehicle control signal and at least one vehicle flight profile in response to said cueing signal.

5. The system as in claim 1 wherein said controller in generating said cueing signal determines at least one pitch attitude limit and at least one roll attitude limit for maintaining said constant vertical state.

6. The system as in claim 5 wherein said controller in determining at least one pitch attitude limit sets a roll attitude value to be constant and in determining at least one roll attitude limit sets a pitch attitude value to be constant.

7. The system as in claim 1 wherein said controller in generating said cueing signal determines the maximum change in pitch attitude and roll attitude.

8. The system as in claim 1 wherein said controller in generating said cueing signal determines pitch attitudes and roll attitudes using conservation of energy based relationships.

9. The system as in claim 8 wherein said conservation of energy based relationships relate pitch attitudes limits and roll attitudes limits to vertical controller parameters.

10. The system as in claim 8 wherein said conservation of energy based relationships relate pitch attitudes limits and roll attitudes limits to torque.

11. The system as in claim 1 wherein said controller in generating said cueing signal determines pitch attitudes and roll attitudes using thrust and gravitational force based relationships.

12. The system as in claim 11 wherein said thrust and gravitational force based relationships relate pitch attitudes limits and roll attitudes limits to torque.

13. The system as in claim 1 wherein said controller performs software limiting tasks when generating said cueing signal.

14. A constant vertical state maintaining cueing system for a vehicle comprising:
   an inceptor having a minimum inceptor position and a maximum inceptor position;
   an airspeed sensor generating an airspeed signal;
   at least one attitude sensor generating an attitude signal; and
   a controller electrically coupled to said airspeed sensor and said at least one attitude sensor, determining at least one vertical inceptor position to maintain a constant vertical state and generating a cueing signal to maintain said constant vertical state in response to said airspeed signal, said attitude signal, said minimum inceptor position, and said maximum inceptor position;

wherein said controller in generating said cueing signal determines pitch attitudes and roll attitudes using conservation of energy based relationships and thrust and gravitational force based relationships.

15. A system for determining the maximum acceleration and deceleration limits that can be achieved on either the longitudinal or lateral axis of an aeronautical vehicle while maintaining a constant vertical state, said vehicle having a vertical control inceptor said system comprising:

a plurality of vehicle performance sensors; and a controller that calculates the vertical control inceptor position required to maintain a desired vertical state, and the maximum and minimum allowable vertical control inceptor positions for desired operation of the vehicle that allow maintaining said vertical state, wherein said minimum and maximum vertical inceptor positions are based on predictions of vehicle performance and further, wherein the desired vertical state is selected from the coup consisting of holding constant altitude, holding constant vertical velocity and holding constant flight path angle.

16. The system as in claim 15 wherein said acceleration and deceleration limits are represented as pitch and roll attitude limits.

17. The system as in claim 15 wherein said acceleration and deceleration limits are represented as an allowable increase or decrease in pitch or roll attitude.

18. The system as in claim 15 wherein said acceleration and deceleration limits are based on the transfer of potential and kinetic energy or the potential change in vertical velocity.

19. The system as in claim 15 wherein said acceleration and deceleration limits are calculated using at least two methods a first method using conservation of energy based relationships and a second method using thrust and gravitational force based relationships and further, wherein the most restrictive result is used.

20. The system as in claim 15 wherein said acceleration and deceleration limits are based on the rotor thrust or torque required to balance the gravitational forces for non-zero pitch or roll attitudes.

* * * * *